(12) United States Patent
Breiholz et al.

(10) Patent No.: US 9,979,934 B1
(45) Date of Patent: May 22, 2018

(54) AUTOMATED WEATHER SENSING SYSTEM AND METHOD USING CAMERAS

(71) Applicants: Arlen E. Breiholz, Cedar Rapids, IA (US); Kevin M. Kronfeld, Cedar Rapids, IA (US); Gregory D. Murray, Houston, TX (US)

(72) Inventors: Arlen E. Breiholz, Cedar Rapids, IA (US); Kevin M. Kronfeld, Cedar Rapids, IA (US); Gregory D. Murray, Houston, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 475 days.

(21) Appl. No.: 14/590,734

(22) Filed: Jan. 6, 2015

(51) Int. Cl.
*H04N 7/18* (2006.01)
*H04N 9/47* (2006.01)
*G01W 1/18* (2006.01)

(52) U.S. Cl.
CPC .............. *H04N 7/183* (2013.01); *G01W 1/18* (2013.01)

(58) Field of Classification Search
None
See application file for complete search history.

(56) References Cited

U.S. PATENT DOCUMENTS

| | | | | |
|---|---|---|---|---|
| 5,995,903 A * | 11/1999 | Smith | ................... | G01C 21/00 340/995.26 |
| 6,240,341 B1 * | 5/2001 | Snyder | ................... | G01C 23/00 345/530 |
| 6,377,201 B1 * | 4/2002 | Chu | ................... | G01S 13/0209 342/118 |
| 7,107,081 B1 * | 9/2006 | Fujisaki | ................... | H04M 1/271 455/575.1 |
| 7,612,688 B1 * | 11/2009 | Vigeant-Langlois | .. | G01C 23/00 340/539.28 |
| 8,633,913 B1 * | 1/2014 | Raghu | ................... | G08G 5/0021 340/945 |
| 9,128,594 B1 * | 9/2015 | Hufnagel | ............ | G06F 3/04845 |
| 9,599,707 B1 * | 3/2017 | Kronfeld | ............... | G01S 13/953 |
| 2002/0039072 A1 * | 4/2002 | Gremmert | ............... | G01S 7/003 340/945 |
| 2003/0193411 A1 * | 10/2003 | Price | ................... | G01C 23/005 340/973 |
| 2007/0048084 A1 * | 3/2007 | Jung | ........................ | G09F 9/30 404/9 |
| 2008/0218384 A1 * | 9/2008 | Varadarajan | ........... | G08G 5/006 340/961 |
| 2009/0179988 A1 * | 7/2009 | Reibel | ................... | G08B 13/19 348/143 |
| 2010/0194628 A1 * | 8/2010 | Christianson | ............. | G01S 7/18 342/26 B |
| 2010/0280753 A1 * | 11/2010 | Chytil | ................... | G01C 23/00 701/532 |

(Continued)

*Primary Examiner* — Talha M Nawaz
(74) *Attorney, Agent, or Firm* — Donna P. Suchy; Daniel M. Barbieri (57) ABSTRACT

Systems and methods can provide an indication of a weather condition. The system can utilize a processor that determines the weather condition from data associated with at least one camera at a remote location. The data can be compared to calibration data for the remote location to determine the weather condition. The indication can be provided to an aircraft. The camera can be a web camera, a traffic camera, infrared camera or other observation device.

18 Claims, 5 Drawing Sheets

(56) References Cited

U.S. PATENT DOCUMENTS

| | | | | |
|---|---|---|---|---|
| 2011/0074624 A1* | 3/2011 | Bunch | ................ | G01S 7/003 342/26 D |
| 2012/0242698 A1* | 9/2012 | Haddick | ............ | G02B 27/0093 345/633 |
| 2012/0249356 A1* | 10/2012 | Shope | ................ | G01S 13/04 342/22 |
| 2013/0027226 A1* | 1/2013 | Cabos | ................ | G08G 5/0013 340/961 |
| 2013/0079957 A1* | 3/2013 | Malka | ................ | G01S 13/953 701/14 |
| 2013/0234884 A1* | 9/2013 | Bunch | ................ | G01W 1/00 342/26 B |
| 2013/0270394 A1* | 10/2013 | Downs | ................ | G05D 1/0027 244/76 R |
| 2014/0063055 A1* | 3/2014 | Osterhout | ............ | G06F 3/005 345/633 |
| 2015/0212236 A1* | 7/2015 | Haas | ................ | G01W 1/10 382/100 |
| 2016/0131739 A1* | 5/2016 | Jinkins | ................ | G01S 13/953 342/26 B |
| 2017/0038457 A1* | 2/2017 | Wang | ................ | G01S 13/951 |
| 2017/0272148 A1* | 9/2017 | Wang | ................ | H04B 7/18506 |

* cited by examiner

AUTOMATED WEATHER SENSING SYSTEM AND METHOD USING CAMERAS

BACKGROUND

The disclosure relates generally to meteorological forecasting methods and/or automatic weather observations and reporting systems. Weather observations are important to many applications, including but not limited to operation or control of aircraft or other vehicles.

Weather observations at remote locations can assist pilots and other users. For example, receiving a weather report for a destination or an airport can assist the pilot in making flight planning decisions. Weather reports from airports are often manually produced and transmitted to aircraft via radio. Many airports lack on-site meteorological staff and automatic weather observation and reporting systems which provide direct weather assessments at the airport. Pilots often must rely on weather reports from airports that have meteorological facilities, even though those facilities may be significantly distant from their destination. Even at airports with automated observation systems, the conditions reported are associated with the single point on the airfield where the automated observation system is located or directed. The airport weather observation system cannot always observe growing or advancing weather systems (e.g., a fog bank over a bay that is advancing and that will cover the airfield).

Thus, there is a need for a system and/or method that provides weather information associated with an airport or other location to a pilot or a user. There is also a need for a weather observation system that uses a real world view of weather from a remote location to a pilot or a user. Still further, there is a need for an automated weather reporting system that is low cost, efficient, and accurate. There is a need for an automatic weather display systems and methods that report weather conditions without substantial ground infrastructure or high communication overhead. There is yet further need for improved weather display systems and methods that display weather conditions in selected regions relevant to the aircraft. There is further need for improved weather radar display systems and methods that provide flight crew with weather observations of a remote location.

It would be desirable to provide a system and/or method that provides one or more of these or other advantageous features. Other features and advantages will be made apparent from the present disclosure. The teachings disclosed extend to those embodiments which fall within the scope of the appended claims, regardless of whether they accomplish one or more of the aforementioned needs.

SUMMARY

In one aspect, inventive concepts disclosed herein are directed to a method of providing a report of a weather condition at a location remote from an aircraft. The method includes selecting on a display screen an area associated with the report, selecting a camera source associated with the area, determining the weather condition at the area using data from the camera source. The data is compared to calibration data to determine the weather condition. The method can also include displaying the weather condition on the display screen.

In another aspect, inventive concepts disclosed herein are directed to a weather observation system for an aircraft. The weather observation system includes a processor and a memory coupled to the processor containing program instructions that when executed cause the processor to obtain data associated with the location remote from the aircraft. The data is provided by a camera remote from the aircraft. The program instructions when executed also cause the processor to determine whether any weather conditions are present using the data and calibration data for the location and to provide an indication of the at least one weather condition to the aircraft.

In another aspect, inventive concepts disclosed herein are directed to a weather observation system. The weather observation includes a processor, a transceiver and a memory. The memory is coupled with the processor and stores data from at least one camera from a remote location. The processor determines a weather condition from the data using calibration data for the remote location and the data. The processor also transmits an indication of the weather condition to an aircraft using the transmitter.

BRIEF DESCRIPTION OF THE DRAWINGS

Exemplary embodiments will become more fully understood from the following detailed description, taken in conjunction with the accompanying drawings, wherein like reference numerals refer to like elements.

DETAILED DESCRIPTION

Referring generally to the figures, systems and methods for providing weather information to pilots or other users are described, according to an exemplary embodiment. A weather observation system is generally configured to provide an indication of remote weather conditions using data from at least one remote camera according to certain embodiments. The image can be processed with a template or calibration image to determine a presence of a weather condition in some embodiments.

Although exemplary embodiments of systems for and methods of providing an indication of a weather condition are described with respect to an aircraft, other applications can benefit from the indication without departing from the scope of this disclosure. A centralized weather observation system receives image or video data from cameras disposed throughout a region or the world in some embodiments. The centralized observation system determines a weather condition upon receiving a request identifying the area for observation and provides the weather condition to an aircraft or other user via Internet, cellphone, radio, or other communications in some embodiments. The centralized weather observation system can be embodied as a web server. Alternatively, the weather observation system can be a non-web based server or application located on an aircraft, a personal computing device (e.g., smartphones) or computing device in a terrestrial location.

The system utilizes a processor that determines the weather condition from data associated with at least one camera at a remote location in some embodiments. The data is compared to or processed with calibration data for the remote location to determine the weather condition in some embodiments. Alternatively, the data can be analyzed to recognize particular weather conditions (e.g., rain, snow, cloud formation, etc.). The indication can be provided to an aircraft via a text message, e-mail, graphic, etc. in some embodiments. The camera can be a web camera, a traffic camera, a security camera, infra-red camera or other observation device in some embodiments.

Figure 1:
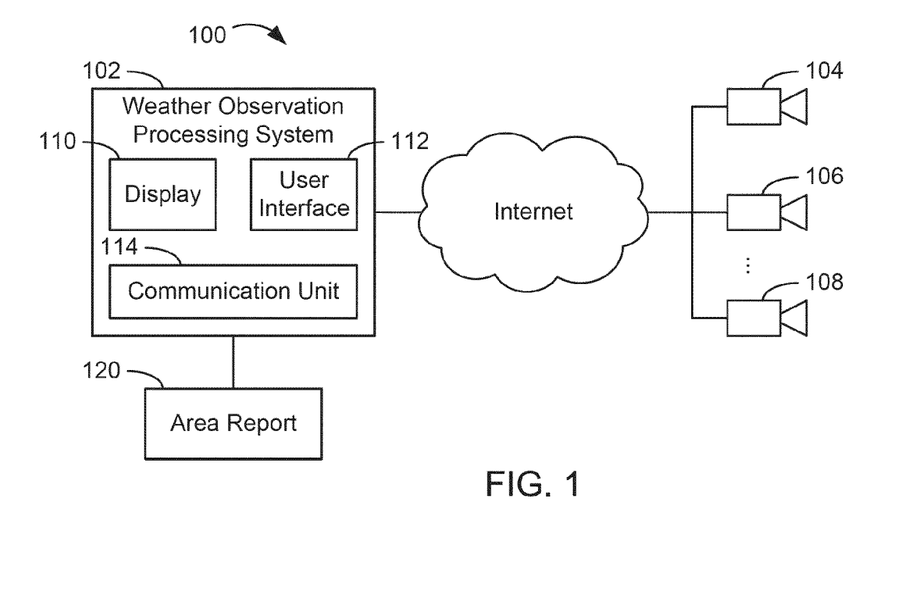
FIG. 1 is a general block diagram of a weather observation system, according to an exemplary embodiment.

With reference to FIG. 1, a weather observation system 100 includes a weather observation processing system 102 and a number of cameras 104, 106, 108 in some embodiments. Cameras 104, 106, and 108 are be connected to weather observation processing system 102 by the Internet, direct connection, wireless connection, by a wide area network connection, a local area network connection, or by other communication infrastructure. Although three cameras 104, 106, and 108 are shown in FIG. 1, weather observation processing system 102 can communicate with any number of cameras distributed in one or more locations.

Weather observation processing system 102 can be implemented on a computer platform located on an aircraft, on a vehicle, on a personal computing device, or at a terrestrial location. Weather observation processing system 102 can be a stand-alone unit, may be a distributed processing system or may be integrated with other systems (e.g., aircraft systems, such as, a flight management computer, a weather radar system).

Weather observation processing system 102 includes a display 110, a user interface 112, and a communication unit 114 in some embodiments. In some embodiments, the display 110 can be located remote from the weather observation processing system 102. The weather observation processing system 102 receives an indication of an area for which weather observation is desired via the user interface 112. The weather observation system 112 identifies one or more cameras 104, 106, and 108 associated with the selected location or area and obtains data from one or more of the cameras 104, 106 and 108 associated with the location or area via the communication unit 114. Data may be provided sequentially over time to perform a historical analysis of the data in some embodiments. Historical compilations of the data can be analyzed to determine weather condition changes, growth, movement, etc. Identifying trending on the sequence of images from at least one of cameras 104, 106, and 108 can be used for weather prediction in some embodiments.

The weather observation processing system 102 can compare the camera images of weather from cameras 104, 106, and 108 to images of known weather conditions at the locations and determine weather conditions. Alternatively, the images can be analyzed to identify particular weather phenomena in some embodiments, such as rain by observing rain droplets on lenses, rain by observing water or puddles in the scene, snow by observing white accumulation on the ground or snowflakes in the air, clarity by observing blue skies or star light, convective weather by observing cloud formations, etc. In other embodiments, the weather observation processing system 102 determines visibility by observing whether landmarks and/or structures that are visible or not visible when compared with calibration data.

The determined weather condition is provided as an area report 120 in some embodiments. The area report 120 can be a graphic showing weather conditions, can be a text message, and can be an oral report (e.g., an audio file) that can be provided via the communication unit 114 to a user, such as a pilot. In some embodiments, the weather observation processing system 102 can provide the area report 120 including a map (e.g., JPEG, or other graphic or image) with symbols showing observations across a large area.

The display 110 can be disposed or co-located within the weather observation processing system 102. In some embodiments, the display 110 is located on an aircraft or at a terrestrial site. In some embodiments, the weather observation processing system 102 is located in a terrestrial unit, and the display 110 is remote from the weather observation processing system 102 and located on an aircraft. Similarly, the user interface 112 can be located in a terrestrial unit or on an aircraft. In some embodiments, the display 110 is a flight display or a head up display, and the user interface 112 is part of a flight control suite for aircraft subsystems. The user interface 112 can be a touch screen, mouse, or other selection device. The display 110 can be a liquid crystal display, or any device for providing visual images.

In one embodiment, the display 110 and the user interface 112 are part of a cellphone or other mobile computing device and bi-directionally communicate with the weather observation processing system 102 embodied as terrestrial based server. In another embodiment, a cellphone is used as a platform for the weather observation processing system 102 including the display 110, the user interface 112, and the communication unit 114. In some embodiments, the weather observation processing system 102 is embodied as a system including a cell phone app or computer program that communicates via cell infrastructure or the Internet to obtain data from one or more of the cameras 104, 106, 108, and provides the area report 120 on the display 110 situated on a cellphone or a computer.

The communication unit 114 is a device (e.g., a transceiver) for communicating wirelessly or otherwise with the Internet and the cameras 104, 106 and 108 and for the providing area report 120 in some embodiments. The communication unit 114 is an avionic data radio, a cell phone transmitter/receiver, an 802.11 receiver/transmitter, etc. in some embodiments.

The cameras 104, 106 and 108 can be web cameras, traffic cameras, or other devices for observing weather. In certain embodiments, the cameras 104, 106 and 108 are visual light cameras and provide video in a video format (e.g., MPEG format) or provide still shots (e.g., in a JPEG format). Although the weather observation processing system 102 is shown in FIG. 1 utilizing data from one or more of the cameras 104, 106 and 108 to determine weather conditions at the areas associated with the cameras 104, 106 and 108 and to provide the area report 120, the cameras 104, 106 and 108 can be associated with a single region or area or can each be associated with a unique area or region in some embodiments.

In some embodiments, large number of cameras 104, 106 and 108 or a network of cameras 104, 106, and 108 can be used to estimate the position and speed of a weather system by correlating images of the clouds from multiple cameras 104, 106, and 108. In some embodiments, outdoor web cameras, security cameras, or other visible light sensors are utilized to provide the network of cameras 104, 106, and 108. Each of the cameras 104, 106, and 108 operates as a Wi-Fi hot spot or is in communication with a wired or wireless network (e.g., the Internet) in some embodiments. The cameras 104, 106, and 108 provide time of day and time of year with image data as well as location data associated with the image data (e.g., location, direction of view).

In some embodiments, the cameras 104, 106 and 108 include additional capabilities and provide additional information about the environment. At least one of the cameras 104, 106 or 108 is a long-wave infrared (LWIR) camera that measures the temperature of various parts of the scene in some embodiments. The use of a LWIR camera enables determination of ground surface temperature as an aid to determining the danger of ice formation, etc.

In some embodiments, at least one of the cameras 104, 106 and 108 embodied as an infrared camera provides additional information if equipped with an appropriate filter wheel to provide distinct images at narrower bands. The cameras 104, 106, and 108 capture one or more images formed in the water vapor band (6.5-7.4 micrometers) in certain embodiments and use these measurements for visibility, rain, and fog determinations. Atmospheric water vapor absorbs energy and re-emits the energy in this band making it possible to draw conclusions about the water content of clouds through observation of that energy by the cameras 104, 106, and 108 in some embodiments. Other similar capabilities can be achieved using satellite meteorology and environmental monitoring techniques.

Figure 2:
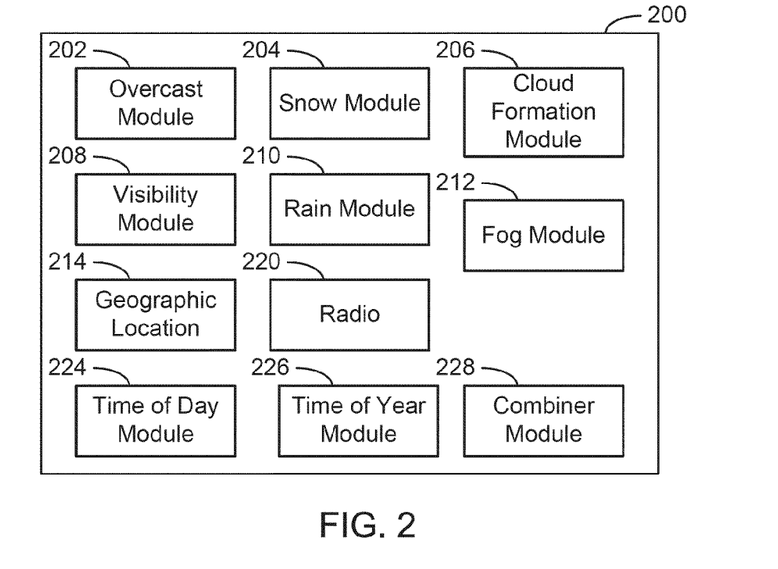
FIG. 2 is a general block diagram of a processor for the weather observation system illustrated in FIG. 1, according to an exemplary embodiment.

With reference to FIG. 2, a processor 200 can be provided in the weather observation processing system 102 (FIG. 1) in some embodiments. The processor 200 can be a computing platform for operating software or hardware/software modules for determining weather conditions for provision as part of the area report 120 (FIG. 1). In some embodiments, an overcast module 202, a snow module 204, a cloud formation module 206, a visibility module 208, a rain module 210, and a fog module 212 are executed to determine weather conditions. The processor 200 includes a geographic location module 214, a radio module 220, a time of day module 224, a time of year module 226, and a combiner module 228. The processor 200 only includes one module of modules 202, 204, 206, 208, 210 and 212 or less than all of modules 202, 204, 206, 208, 210 and 212 in some embodiments. Although modules 202, 204, 206, 208, 210 and 212 are described as separate modules, modules 202, 204, 206, 208, 210 and 212 can be combined as one or more modules executed by processor 200. In some embodiments, modules 224 and 226 can be a memory for storing time stamps and time of year stamps provided with images from cameras 104, 106, and 108.

Modules 202, 204, 206, 208, 210 and 212 can use comparisons between calibration images and images observed by one or more of the cameras 104, 106 and 108 to determine an overcast condition, a snow condition, cloud formation, a high or low visibility condition, a rain condition or a fog condition, respectively. In some embodiments, the weather observation processing system 102 compares the image provided by one of cameras 104, 106 and 108 to a calibration image associated with cameras 104, 106 and 108. The calibration images are manually chosen from prior captured images associated with observed weather conditions, such as overcast, snow, cloud formations, visibility, rain, etc. For example, the overcast module 202 can determine the presence or absence of geographic features in the camera image with respect to the calibration image to determine a level of overcast condition. In some embodiments, the snow module 204 can use one or more of: temperature indication and data from the rain module 210, observations of snow accumulation over time, and a comparison of a snow condition in the calibration data to the camera data, or observations of snowflakes in the camera data to determine a snow condition. In some embodiments, the rain module 210 can use one or more of: observations of water and temperature to determine a rain condition an observation of rain droplets on the camera lens, a measure of water content in the air, a comparison of a rain condition in the calibration data to the camera data, etc. to determine a rain condition. In some embodiments, the fog module 212 can use one or more of: observations of water and temperature, a measure of water content the air, a comparison of a fog condition in the calibration data to the camera data, etc. to determine a fog condition. In some embodiments, the cloud formation module 206 can be used to identify types of cloud formations to determine convective and low visibility conditions. The cloud formation module 206 can use data from the overcast module 202 to determine the presence of low lying clouds.

The calibration images are indexed according to the time of year and time of day as well as geographic location in some embodiments. A data base can be provided with manually classified weather conditions associated an image for each time of day, time of year, and geographic location in some embodiments. The weather observation processing system 102 can compare the calibration images to the captured image to determine a most likely match to a particular weather condition for providing the area report 120.

In some embodiments, the overcast module 202 uses a matching algorithm associated with degrees of overcast conditions in calibration images to determine the level of the overcast condition in some embodiments. The overcast module 202 can provide an indication of the altitude of cloud cover. In some embodiments, the snow module 204 utilizes a matching algorithm associated with degrees of overcast conditions in calibration images to determine the level of the overcast condition in some embodiments. In some embodiment, the cloud formation module 206 utilizes matching techniques to determine types of clouds. Types of clouds can be utilized to predict more severe weather in an area and identify fronts and convective regions.

In some embodiments, the visibility module 208 compares the camera image to match the camera image to a calibration image associated with each visibility level in some embodiments. The visibility module 208 determines the amount of visibility available by matching visibility levels via brightness, contrast, and/or chromaticity to calibration images associated with levels of visibility in some embodiments. Landmarks which become less visible are used to determine the visibility level in some embodiments. The visibility level can be classified as a distance of visibility.

The rain module 210 compares the camera image to match it to a calibration image associated with rain in some embodiments. In some embodiments, the fog module 212 can be utilized to identify fog and to identify movement of fog. In some embodiments, fog is identified by determining visibility levels from data from the visibility module 208 and its movement with respect to landmarks can be tracked. In addition, the fog module 212 can utilize information from other locations to determine the speed and direction of fog travel in some embodiments.

The processor 200 includes a radio module 220 for providing communications via the communication unit 114 to aircraft such as a communication of the area report 120 in some embodiments. The radio module 220 can format messages for a text message, a facsimile message, an image, an e-mail, or a voice report as the area report 120 (FIG. 1) to be transmitted by the communication unit 114 in some embodiments.

The time of day module 224 can provide a time of day so that comparisons of calibration data and the image data from the cameras 104, 106 and 108 can be compared at an appropriate time of day. Lighting effects can be considered due to the time of day using the time of day module 224.

The time of year module 226 provides an indication of the time of year. Time of year can be used to make comparisons of calibration data at an appropriate time of year to image data from the cameras 106, 104 and 108. Lighting effects can be considered due to time of year using the time of year module 226. In some embodiments, the time of day module 224 and the time of year module 226 can adjust calibration images with the sampled time of year and time of day before comparison to the camera image.

The geographic location module 214 can be used to identify locations of various cameras and determine the relationship between the locations of various cameras. The geographic location module 214 can also determine the direction that the cameras 104,0106, and 108 are facing and coordinate those directions for use in modules 202, 204, 206, 208, 210, and 212 and the combiner module 228. The geographic location module 214 can provide data for the one or more destinations or aircraft in some embodiments. Data from the geographic location module 214 can be used to identify more precise runway locations and to identify if the weather condition is relevant to a runway (e.g., moving toward or away from the runway).

The combiner module 228 combines images from various cameras 104, 106 and 108 from various areas or from cameras 104, 106 and 108 that point in various directions to provide appropriate decisions about movement of weather, etc. In addition, the combiner module 228 compares images occurring at different times. The combiner module 228 can be utilized to determine differences in images as they are provided by the cameras 104, 106 and 108 in time, thereby allowing movement to be more closely tracked. The movement can be tracked with respect to the most relevant portions of the airport using data from the geographic location module 214 in some embodiments.

Figure 3:
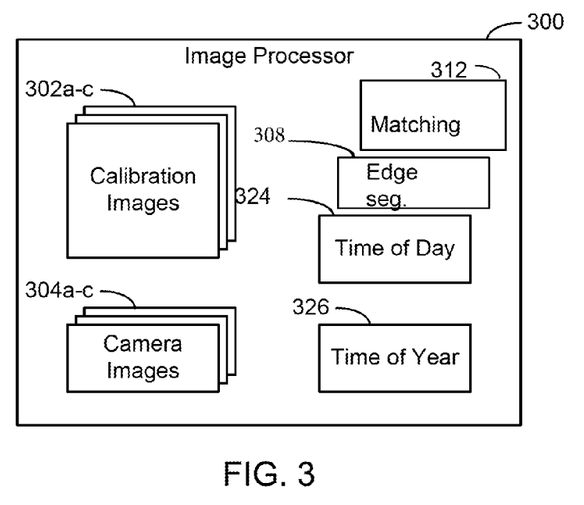
FIG. 3 is a more detailed block diagram for the processor illustrated in FIG. 2, according to another exemplary embodiment.

With reference to FIG. 3, an image processor 300 is included as part of processor 200 or in weather observation processing system 102 in some embodiments. The image processor 300 provides image processing for comparing calibration images 302A-C with images 304A-C from cameras 104, 106 and 108. The images 302A-C are stored in a database on a server in some embodiments. In some embodiments, the processor 200 can be configured to perform the operations of the image processor 300. In some embodiments, modules 202, 204, 206, 208, 210 and 212 can perform the operations of the image processor 300.

The image processor 300 can utilize various image processing techniques to assist identification of weather conditions. For example, image color management, alignment, segmentation, histogram analysis, edge detection and cross correlation can be used to determine whether weather is present in an image.

The image processor 300 includes an edge segmentation module 308 and a matching module 312 in some embodiments. In some embodiments, the image processor 300 communicates with or includes a time of day module 324 and a time of year module 326. The image processor 300 analyzes and process images for use in the processor 200 and the modules 202, 204, 206, 208, 210, and 212 in some embodiments.

The edge segmentation module 308 can be utilized to determine edges in an image and whether those edges are present. If structures, landmarks, etc. in the calibration images 102A-C are shown as hidden or with reduced contrast, determinations can be made related to overcast and visibility. Edge determination can be used to determine whether structures, landmarks, etc. are partially hidden or hidden. If an edge is hidden, the visibility is poor.

The matching module 312 employs matching algorithms to compare the camera images 304A-C and the calibration images 302A-C in some embodiments. The matching algorithms can include color matching, pattern matching, edge matching, segmentation matching, shape matching, etc. Matching algorithms can be utilized to identify overcast features, visibility features, snow, rain, cloud formations, and fog by determining the closest match to calibration images associated with particular weather phenomena and levels thereof.

Figure 4:
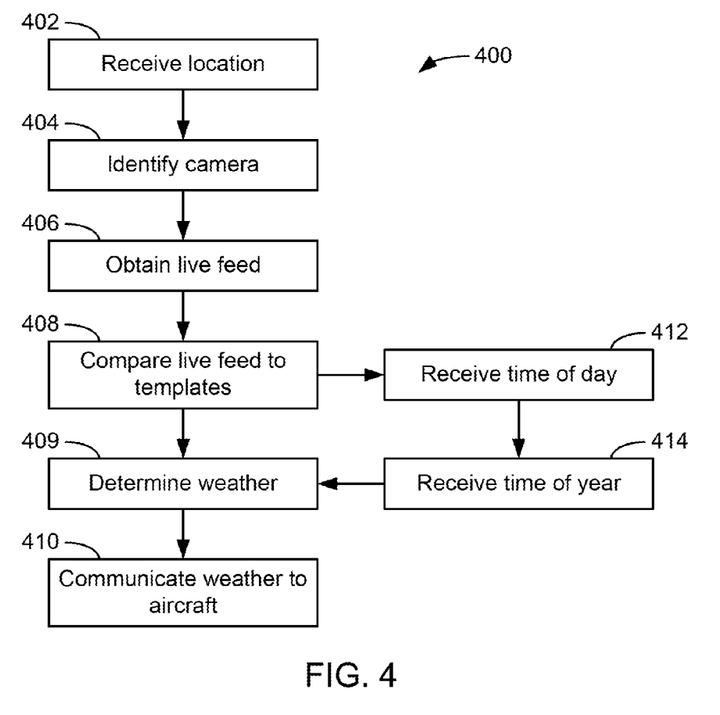
FIG. 4 is a general flow diagram showing a process performed by the weather observation system illustrated in FIG. 1, according to an exemplary embodiment.

With reference to FIG. 4, a flow 400 shows an exemplary operation for weather observation system 100 (FIG. 1). At an operation 402, a location for weather observation is received by the weather observation system 100 via the user interface 112 in some embodiments. The location can be a specific airport, area, region, or a broad geographic area (e.g., a state). At operation 402, the processor 200 receives the geographic location either via a map, airport abbreviation, or coordinates provided through the user interface 112 in some embodiments. The geographic location can be utilized to look up available cameras associated with the geographic location.

Once cameras are identified in an operation 404, data can be provided from one or more of the identified cameras 104, 106, 108, to the weather observation processing system 102 in some embodiments. Data can be provided as live camera feeds or camera images 304A-C (FIG. 3) in an operation 406. In some embodiments, the feed can be a real time feed, a delayed feed, near real time feed, a time lapsed feed, etc. In some embodiments, more than one camera is identified in operation 404.

At an operation 408, the camera images 304A-C are compared to the calibration images 302A-C or templates in some embodiments. The comparisons can be made using the matching module 312 or the edge segmentation module 308 in some embodiments. In addition, analysis can be performed to determine whether there is a presence of water droplets, snow, particular cloud formations, etc. in some embodiments. At an operation 409, a weather condition is determined based upon the comparison in operation 408. At an operation 410, the determined weather is communicated to an aircraft or user. Operations 408 and 409 can utilize the time of day received in an operation 412 and the time of year received in an operation 414 for making appropriate comparisons in some embodiments. For example, the calibration images 302A-C can each be associated with a particular time and a particular time of year.

In some embodiments, the weather observation system 100 operates as centralized ground based system that receives data from an airport or location chosen by a pilot. The weather observation automatically determines at least one condition at the airport (e.g., visibility) and continues to monitor the airport using data form one or more of the cameras 104, 106, and 108. The weather observation system 100 provides a text message to the pilot when the initial assessment is made in some embodiments. In some embodiments, the weather observation system 100 provides another text message when the assessment changes from the initial assessment. In some embodiments, reassessments can occur every 15 minutes.

Figure 5:
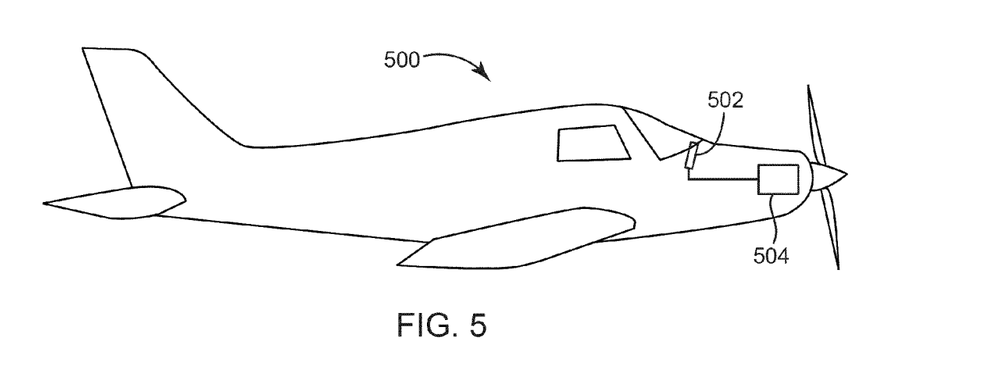
FIG. 5 is a side view schematic illustration of an aircraft including a display for providing a weather report from the weather observation system illustrated in FIG. 1, according to an exemplary embodiment.

With reference to FIG. 5, an aircraft 500 includes a display 502 and a communication unit 504. The communication unit 504 can include the weather observation processing system 102 or can simply be a communication system that receives the weather observation data from the weather observation processing system 102. The weather conditions can be provided on the display 502 as a text message or graphical image. Alternatively, the display 502 can be a cellphone, mobile computing device, etc. In one embodiment, the display 502 includes a speaker for receiving audio weather reports such as the area report 120.

The display 502 can provide an output from other aircraft systems. The views of weather may include monochrome or color graphical representations of the weather. Graphical representations of weather may include an indication of altitude of those objects or the altitude relative to the aircraft. The display 502 can further include other user interface elements such as an audio alerting device (e.g., speaker, electro-acoustic transducer, etc.), input devices (e.g., touch screens, joysticks, buttons, trackballs, etc.), and illuminating or flashing lamps or lights. In some embodiments, the views of weather can be provided to ground personnel, such as, a dispatch person.

Figure 6:
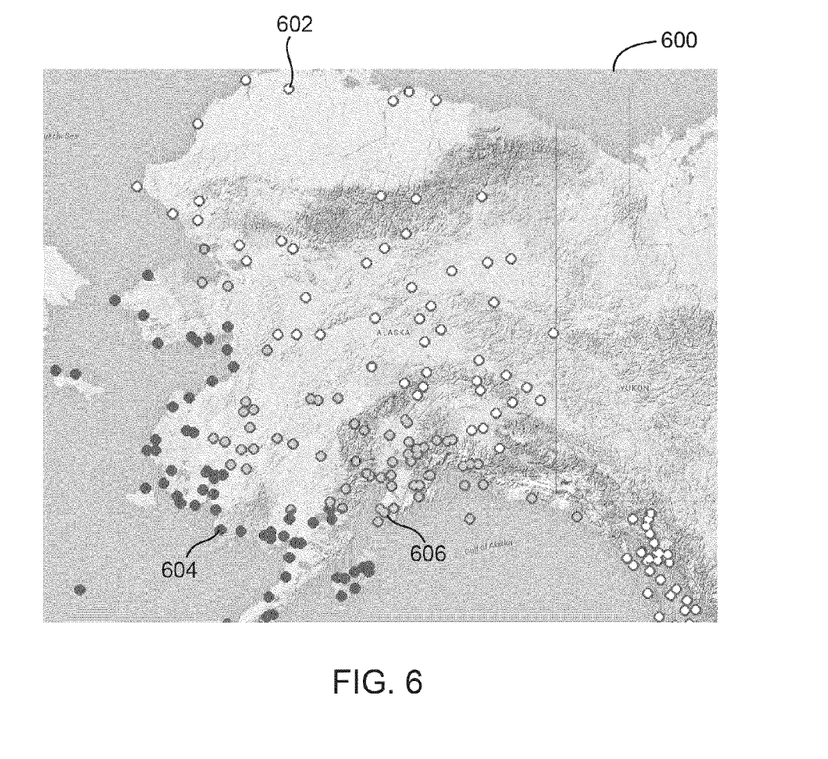
FIG. 6 is a display screen for the weather observation system illustrated in FIG. 1 showing weather conditions at locations in a region, according to an exemplary embodiment.

With reference to FIG. 6, weather condition data can be provided as a screen shot or display 600 to the aircraft 500. The display 600 can include icons 602 and 604. Each of the icons 602 and 604 can represent a camera or a group of cameras at a particular location. The image data associated with the cameras 104, 106, 108 (FIG. 1) associated with the icons 602 and 604 is analyzed to determine weather conditions. The icons 602 and 604 are colored according to weather conditions in some embodiments. For example, the icon 604 can have a darker color than the icons 602 indicating a low visibility condition. In some embodiments, icons 606 can be provided and have a color or shading indicating intermediate visibility between clear (the icons 602) and low (the icons 604). In this way, pilots can view a very large area of weather and determine if there is a border or front line where weather conditions have changed or are changing. Such a map can provide significant advantages to pilots choosing airports or other destinations. In one embodiment, the icons 602 have different shapes to indicate different weather conditions. For example, fog could be represented by a square and no fog could be represented by a circle. Alternatively, the squares and circles can be colored to represent types of weather. In one embodiment, the display 600 includes multiple screens, one for each type of weather, coded with icons. For example, a screen 600 can be configured to display areas of fog, areas of precipitation, areas of low visibility, layers of low overcast, and areas of convective regions on separate screens. In some embodiments, the display 600 can be provided to ground personnel, such as, a dispatch person in addition to or instead of the pilot.

In some embodiments, the display 600 includes icons for a number of web cameras maintained by the Federal Aviation Administration. Data for the icon and its associated weather representation can be provided by a server communicating with the web cameras in some embodiments. The display 600 shows a map of the state of Alaska with icons representing web cameras deployed at particular locations in some embodiments. The display 600 advantageously provides a simplified display of weather conditions for Alaska which does not require the downloading of each weather image from each location. Accordingly, the display 600 does not require as much communication overhead as a full downloading of each image from each of the cameras 104, 106, and 108. The condition for each of the cameras 104, 106, and 108 can be determined locally at each camera 104, 106, and 108 or by a centralized weather observation processing system 102. The centralized web server can generate the image for the display 600 in some embodiments. The display 600 includes data from temperature reports, satellite images, other terrestrial sources, etc. in some embodiments.

Figure 7:
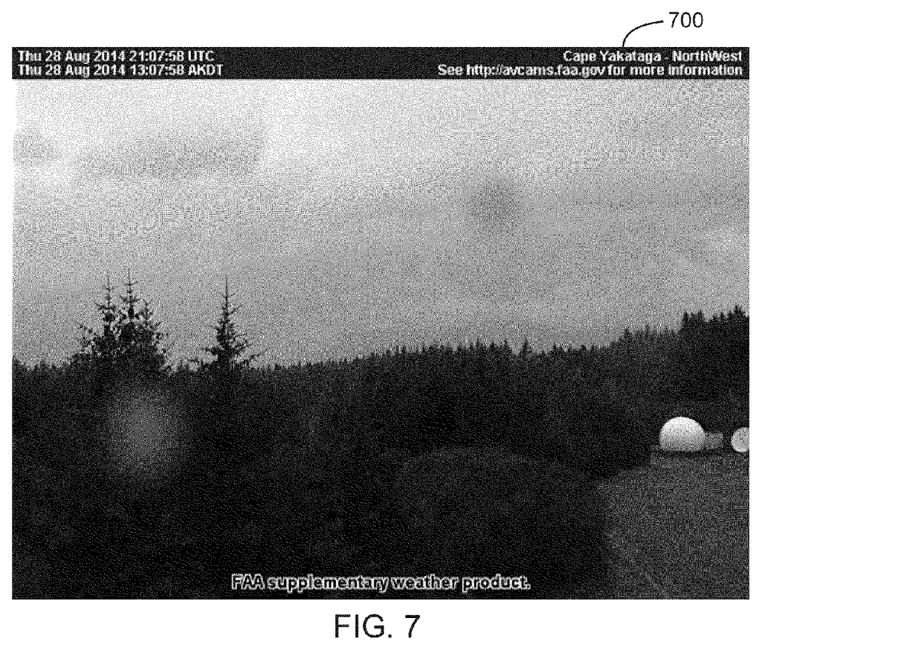
FIG. 7 is an image showing lower visibility at a scene captured by a camera for use in the weather observation system illustrated in FIG. 1, according to another exemplary embodiment.

With reference to FIG. 7, an image 700 represents a scene with a sky that is heavily overcast. Rain has recently fallen and can be detected due to droplets on a lens. The image 700 can be used as a calibration image for a heavily overcast day. The calibration image can be chosen by manual observation and loaded into a database according to the location, the weather condition, the time of day and time of year.

Figure 8:
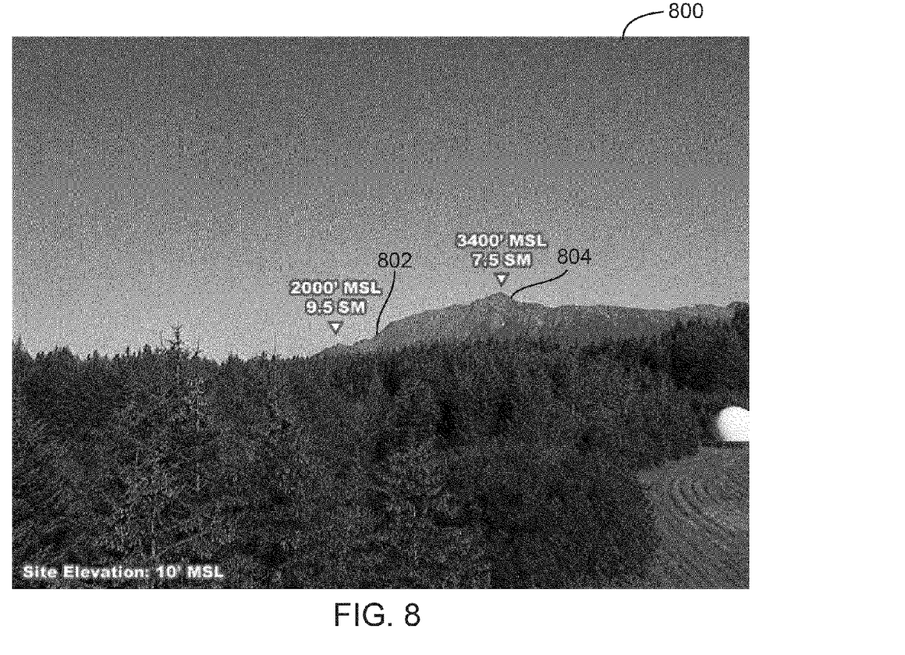
FIG. 8 is an image of the scene illustrated in FIG. 7 showing clear visibility captured by a camera for use in the weather observation system illustrated in FIG. 1, according to another exemplary embodiment.

With reference to FIG. 8, an image 800 of the same scene shown in the image 700 on a lightly overcast day is shown. The overcast can be detected as geographic features 802 and 804 are not visible in the image 700. If a region has been determined to contain a visible landmark (e.g., feature 802 or 804), failure to detect an edge within that region would be sufficient to indicate reduced visibility. The identification of the altitude of geographic features 802 and 804 allows a height of overcast to be determined.

The image 800 can be utilized as a calibration image for a clear day. Automated capture of calibration images can be achieved by utilizing image segmentation. Contrast and brightness levels of a video feed can be compared to the images 700 and 800 to determine a level of overcast condition for the scene. In addition, the images 700 and 800 can be analyzed to determine what types of cloud formations and sequences of cloud formations are provided to identify areas of convective activity. In addition, the images 700 and 800 can be tracked over time to determine the approach of fog, such as offshore fog, estimate speed and direction of winds aloft, etc. Using multiple cameras in a given area can be used to provide combined observations which improve the accuracy of estimations.

Figure 9:
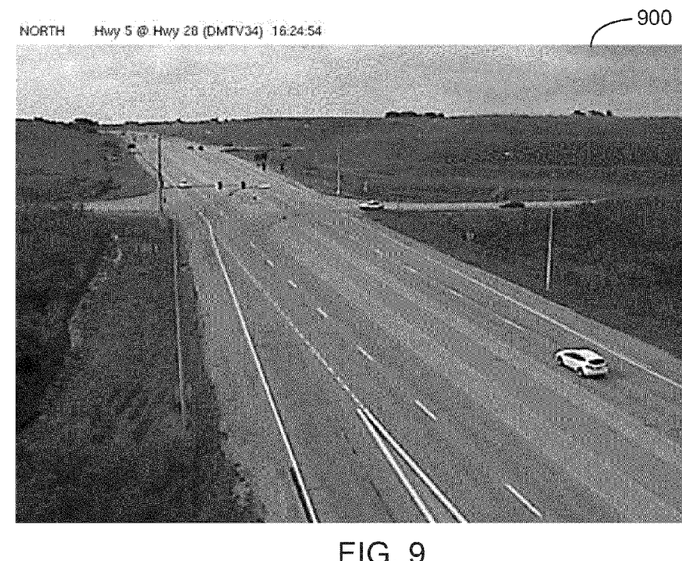
FIG. 9 is an image from a traffic camera for use in the weather observation system illustrated in FIG. 1, according to yet another exemplary embodiment.
Figure 10:
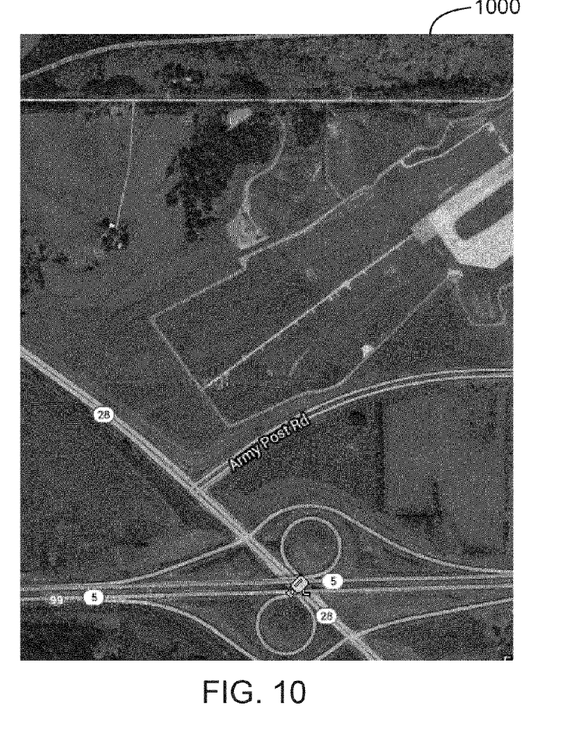
FIG. 10 is a GOOGLE EARTH™ map view of the area around the traffic camera illustrated in FIG. 9, according to another exemplary embodiment.

With reference to FIG. 9, an image 900 can be provided by a traffic camera. With reference to FIG. 10, as shown in map 1000, the image 900 is provided by a camera 1002. The map 1000 can be provided by various map databases such as a GOOGLE EARTH web site. By utilizing the map 1000, the weather observation processing system 102 (FIG. 1) can determine locations associated with the camera view. For example, the distance to a first street corner in the image 900 is approximately 0.1 miles and a distance to the more distant corner is approximately 0.2 miles. As shown in the image 900, the image 900 can be processed to determine that there is heavy overcast but no precipitation. Automated calibration data classification can be made by location using the map 1000.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

According to various exemplary embodiments, portions of the weather observation system 100 can be embodied as hardware and/or software. In exemplary embodiments where the processes are embodied as software, the processes may be executed as computer code on processing or hardware architecture (e.g., a computing platform that can receive image data). The processes can be performed separately, simultaneously, sequentially or independently with respect to each other.

While the detailed drawings, specific examples, detailed algorithms and particular configurations given describe preferred and exemplary embodiments, they serve the purpose of illustration only. The inventions disclosed are not limited to the specific forms and equations shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

Some embodiments within the scope of the present disclosure may include program products comprising machine-readable storage media for carrying or having machine-executable instructions or data structures stored thereon. Such machine-readable storage media can be any available media which can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

What is claimed is:

1. A method of providing a report of a weather condition at a location remote from an aircraft, the method comprising:
    selecting, on a display screen, an area associated with the report;
    selecting a camera source associated with the area, wherein the camera source is a passive infra-red or visible light camera;
    determining the weather condition at the area using data from the camera source, the data from the camera source representing an image at the area passively sensed by the camera source, wherein the weather condition is determined by processing the data from the camera source to determine edges in the image,
    wherein the data is compared to calibration data for the area to determine the weather condition, wherein the calibration data is compared to the data from the camera source to determine if a geographic feature in the calibration data is present and wherein the calibration data is associated with a clear view,
    wherein the edges are used to determine the weather condition,
    wherein presence of the edges is an indication of whether structures or landmarks associated with the area are hidden or partially hidden by the weather condition; and
    displaying the weather condition on the display screen.

2. The method of claim 1, wherein the camera source is a first camera source and further comprising:
    selecting a second camera source associated with the area and using the data from the first camera source and the second camera source to determine movement of the weather condition.

3. The method of claim 1, wherein the data from the camera source is provided over time and movement of the weather condition is determined using the data provided over time.

4. The method of claim 1, wherein the weather condition is fog, or visibility.

5. The method of claim 1, further comprising transmitting the indication of the weather condition to the aircraft or to ground personnel.

6. The method of claim 1, further comprising processing the data from the camera source using at least one of image color management, alignment, segmentation, histogram analysis, and cross correlation.

7. The method of claim 1, wherein the camera source is a web camera.

8. A weather observation system for an aircraft comprising:
    at least one processor; and
    a memory coupled to the at least one processor and containing program instructions that, when executed by the at least one processor, cause the at least one processor to;
    receive image data associated with a location remote from the aircraft, the image data being provided by a camera remote from the aircraft, wherein the image data represents passively sensed infrared or visible light;

determine if any weather conditions are present using the image data and calibration data for the location, wherein the calibration data is compared to the image data from the camera to determine if a geographic feature in the calibration data is present and wherein the calibration data is associated with a clear view, wherein the image data is processed by using edge detection to determine if a structure or landmark is hidden or partially hidden; and provide an indication of at least one of the weather conditions to the aircraft.

9. The weather observation system of claim 8, wherein the calibration data is referenced to a time of day.

10. The weather observation system of claim 8, wherein the calibration data is referenced to a time of year.

11. The weather observation system of claim 8, wherein the edge detection is used to determine if the landmark or structure has a reduced contrast to determine the at least one of the weather conditions.

12. The weather observation system of claim 8, wherein the at least one processor is configured to receive multiple images over time to determine weather growth or movement of the at least one of the weather conditions.

13. The weather observation system of claim 8, wherein the indication of the at least one of the weather conditions is displayed on a display of the aircraft.

14. The weather observation system of claim 8, wherein the camera is a web camera or an infrared camera.

15. The weather observation system of claim 8, wherein the camera is a traffic camera.

16. A weather observation system, comprising:

at least one processor;

a transceiver coupled with the at least one processor; and a memory coupled to the at least one processor and storing image data from at least one camera from a remote location, wherein the image data represents passively sensed infrared or visible light, wherein the at least one processor determines a weather condition from the image data using calibration data for the remote location, wherein the calibration data is compared to the image data from the camera to determine if a geographic feature in the calibration data is present and wherein the calibration data is associated with a clear view, wherein the image data is processed by using edge detection to determine if a structure or landmark is hidden or partially hidden, wherein the transceiver transmits an indication of the weather condition to an aircraft.

17. The weather observation system of claim 16, wherein the image data is a live video format and the calibration data is stored in the memory of the weather observation system.

18. The weather observation system of claim 16, wherein the at least one processor provides a map of weather condition symbols determined from multiple locations associated with camera locations.

* * * * *